(12) United States Patent
Phegade et al.

(10) Patent No.: US 10,701,039 B2
(45) Date of Patent: Jun. 30, 2020

(54) MUTUAL APPROVAL FOR PRIVACY-PRESERVING COMPUTING

(71) Applicant: Intel Corporation, Santa Clara, CA (US)

(72) Inventors: Vinay Phegade, Beaverton, OR (US); Huaiyu Liu, Portland, OR (US); Jesse Walker, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 926 days.

(21) Appl. No.: 14/866,264

(22) Filed: Sep. 25, 2015

(65) Prior Publication Data

US 2017/0093806 A1    Mar. 30, 2017

(51) Int. Cl.
*H04L 29/06*    (2006.01)

(52) U.S. Cl.
CPC ...... *H04L 63/0428* (2013.01); *H04L 63/0869* (2013.01); *H04L 63/06* (2013.01); *H04L 63/126* (2013.01); *H04L 2209/46* (2013.01)

(58) Field of Classification Search
CPC . H04L 63/0428; H04L 63/0869; H04L 63/06; H04L 63/126; H04L 2209/46
See application file for complete search history.

(56) References Cited

U.S. PATENT DOCUMENTS

| | | | |
|---|---|---|---|
| 7,380,138 B2 * | 5/2008 | Chen | ............ H04L 9/083 380/259 |
| 8,572,757 B1 | 10/2013 | Stamos et al. | |
| 9,118,639 B2 | 8/2015 | Phegade et al. | |
| 9,141,769 B1 * | 9/2015 | Hitchcock | ............ H04L 9/14 |
| 9,680,872 B1 * | 6/2017 | Roth | ............ H04L 63/20 |
| 2004/0098454 A1 * | 5/2004 | Trapp | ............ G06Q 10/10 709/204 |
| 2005/0005106 A1 * | 1/2005 | Chen | ............ H04L 9/083 713/165 |
| 2013/0096943 A1 * | 4/2013 | Carey | ............ G06Q 10/10 705/2 |
| 2013/0103423 A1 | 4/2013 | Kim | |
| 2014/0095890 A1 * | 4/2014 | Mangalore | ............ G06F 21/10 713/189 |
| 2014/0096182 A1 * | 4/2014 | Smith | ............ H04L 9/0872 726/1 |
| 2014/0281511 A1 * | 9/2014 | Kaushik | ............ G06F 21/602 713/164 |
| 2014/0281520 A1 | 9/2014 | Selgas et al. | |
| 2015/0006890 A1 * | 1/2015 | Roth | ............ G06F 21/6254 713/165 |

(Continued)

OTHER PUBLICATIONS

International Search Report and Written Opinion received for PCT Patent Application No. PCT/2016/053838, dated Jan. 12, 2017, 12 pages.

(Continued)

*Primary Examiner* — Hee K Song

(57) ABSTRACT

Various embodiments are generally directed to the providing for mutual authentication and secure distributed processing of multi-party data. In particular, an experiment may be submitted to include the distributed processing of private data owned by multiple distrustful entities. Private data providers may authorize the experiment and securely transfer the private data for processing by trusted computing nodes in a pool of trusted computing nodes.

14 Claims, 12 Drawing Sheets

(56) References Cited

U.S. PATENT DOCUMENTS

| | | | | |
|---|---|---|---|---|
| 2015/0058629 A1* | 2/2015 | Yarvis | ............... | H04L 63/061 |
| | | | | 713/171 |
| 2015/0106869 A1* | 4/2015 | Cabrera | ............. | G06F 21/33 |
| | | | | 726/1 |
| 2015/0178052 A1* | 6/2015 | Gupta | .................. | G06F 8/34 |
| | | | | 717/105 |
| 2016/0036826 A1* | 2/2016 | Pogorelik | .......... | H04L 63/062 |
| | | | | 726/1 |
| 2016/0085916 A1* | 3/2016 | Smith | ............... | G06F 19/322 |
| | | | | 705/3 |
| 2016/0182221 A1* | 6/2016 | Cucinotta | ........ | H04L 63/0853 |
| | | | | 713/153 |
| 2016/0330172 A1* | 11/2016 | Muttik | ............ | H04L 63/0281 |

OTHER PUBLICATIONS

Maniatis et al., "Do You Know Where Your Data Are? Secure Data Capsules for Deployable Data Protection", Association for Computing Machinery, 2011, 5 pages.

Yau et al., "Securing Grid Workflows with Trusted Computing", Cluster Computing and the Grid, 2008. CCGRID '08. 8th IEEE International Symposium, May 19-22, 2008, 10 pages.

Lee et al., "π Box: a platform for privacy-preserving apps", 10th USENIX Symposium on Networked Systems Design and Implementation (NSDI '13), 2013, 14 pages.

Mohan et al., "GUPT: privacy preserving data analysis made easy", SIGMOD '12, May 20-24, 2012, 12 pages.

* cited by examiner

MUTUAL APPROVAL FOR PRIVACY-PRESERVING COMPUTING

TECHNICAL FIELD

Embodiments described herein generally relate to preserving privacy of data sets for distributed computing or cloud computing.

BACKGROUND

Modern research activities may include processing large amounts of data, which may be owned by multiple entities. For example, precision medicine in an emerging field of medicine where medical decisions, practices, and/or products may be tailored to an individual patient based on computational diagnostics. However, such diagnostics typically require processing large amounts of genomic data corresponding to the patent as well as to multiple other patients. Often, this data is private, subject to various anti disclosure laws or requirements and owned by multiple different entities, such as, for example, hospitals, clinics, or the like. Accordingly, due to such privacy or other concerns, the data must remain confidential before, during, and after the computational processing is complete.

DETAILED DESCRIPTION

Figure 1:
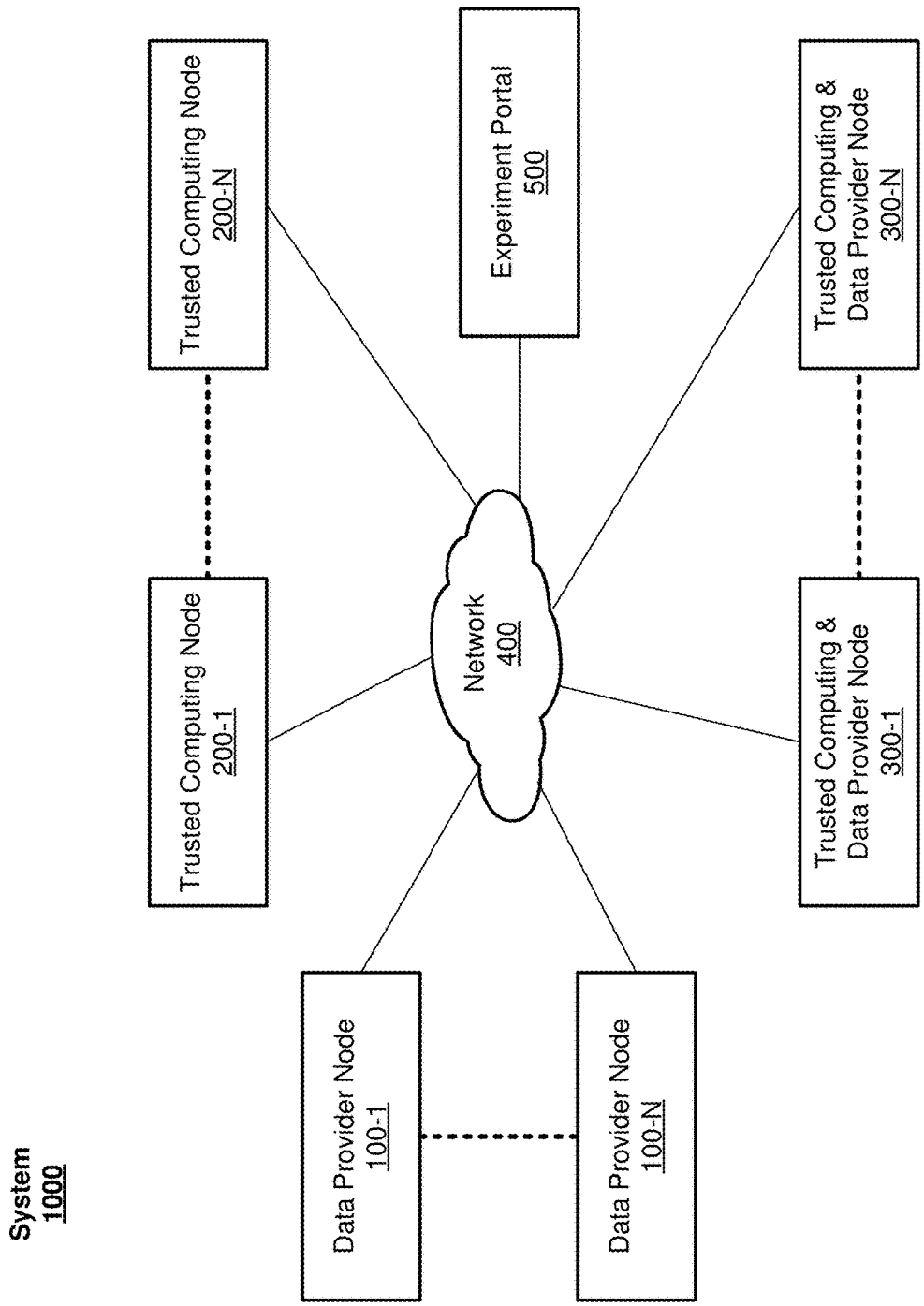
FIG. 1 illustrates a block diagram of a system according to an embodiment.

Various embodiments are generally directed to processing multiple datasets owned by different entities while preserving privacy and control of the datasets. In particular, the present disclosure provides a computing system where trusted computing on data owned by multiple parties can be performed over distributed pools of computing resources. Each of the data owners can retain control of the data before, during, and after the workflow. In general, the system provides for application of directed acyclic graphs (DAG) on the combined datasets. A trusted computing cluster may be provided to apply various patterns of DAG computation, such as, for example, map, reduce, analytics, results, or the like. Furthermore, privacy of the data can be maintained. In particular, the system can maintain data confidentiality and integrity during transfer of the data provider to a trusted computer in the pool, during storage, and at execution, for example, by encryption, use of trusted execution engines, or the like. Additionally, the results may be protected to preserve privacy and reduce data identification.

It is important to note, that the present disclosure provides a system for trusted computing on datasets provides by multiple distrustful entities. As such, distributed computation over the datasets may be facilitated without the need for legal agreements, which can be cumbersome to arrange and do not prevent data theft. Furthermore, some types of data (e.g., medical imagery, genomic data, or the like) are difficult to obfuscate without rendering the data useless. As such, conventional data de-identification techniques cannot typically be used on this type of data.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a system for distributed computing on data owned by multiple distrustful entities. In general, the system 1000 includes a number of nodes operably coupled (e.g., via the Internet, or the like) and configured to process data on multiple ones of the nodes, where the source of the data is also multiple (e.g., the same, or different ones) of the nodes. More specifically, the system 1000 may include data provider notes 100-1 to 100-N, trusted computing nodes 200-1 to 200-N, and trusted computing & data provider nodes 300-1 to 300-N. It is noted, that N may be any positive integer and more specifically, the system 1000 may be implemented with any number of nodes 100, 200, and/or 300. Furthermore, the number of data provider nodes 100 does not need to be the same as the number of trusted computing nodes 200. Likewise, the number of data provider nodes 100 and/or trusted computing nodes 200 does not need to be the same as the number of trusted computing & data provider nodes 300.

Each of the nodes 100-1 to 100-N, 200-1 to 200-N, and 300-1 to 300-N are operably coupled via network 400. In general, the network 400 may be any network, such as, for example, a wide area network, the Internet, or the like. The nodes may be deployed at various institutions. For example, in the context of medical and/or pharmaceutical research, the nodes may be deployed at universities, hospitals, clinics, pharmaceutical research facilities, government facilities, or the like. As another example, in the context of economic research, the nodes may be deployed at universities, banks, investment institutions, government facilities, economic research facilities, demographic research facilities, or the like. It is noted, that these examples are given for purpose of clarity of presentation only and are not to be limiting. In particular, the present disclosure may be implement to provide for secure distributed processing of data owned by multiple distrustful entities in any context and is not specifically limited to medical, pharmaceutical, or economic research.

Figure 7:
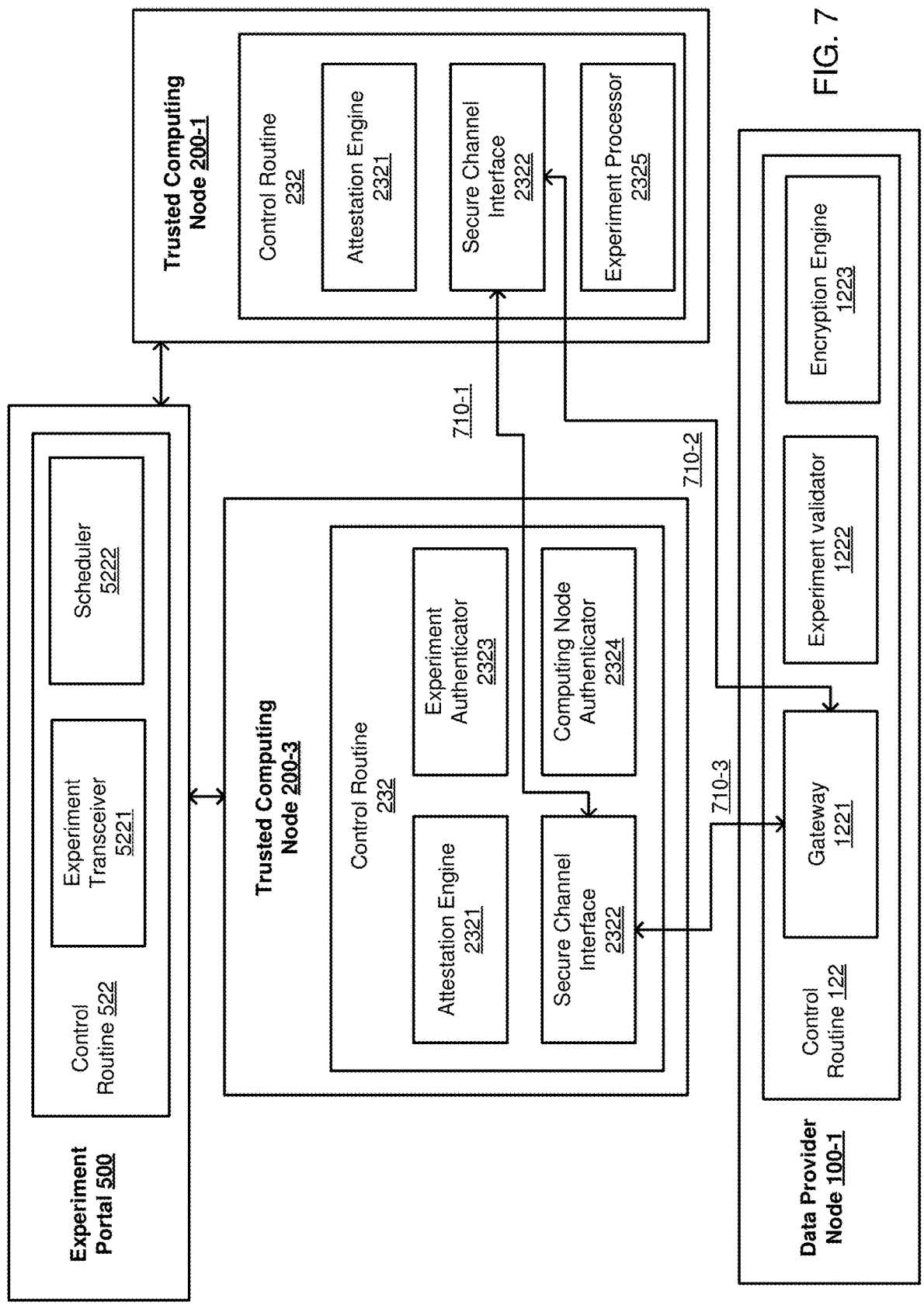
FIG. 7 illustrates a block diagram of a portion of the implementation of FIG. 2 according to an embodiment.
Figure 8:
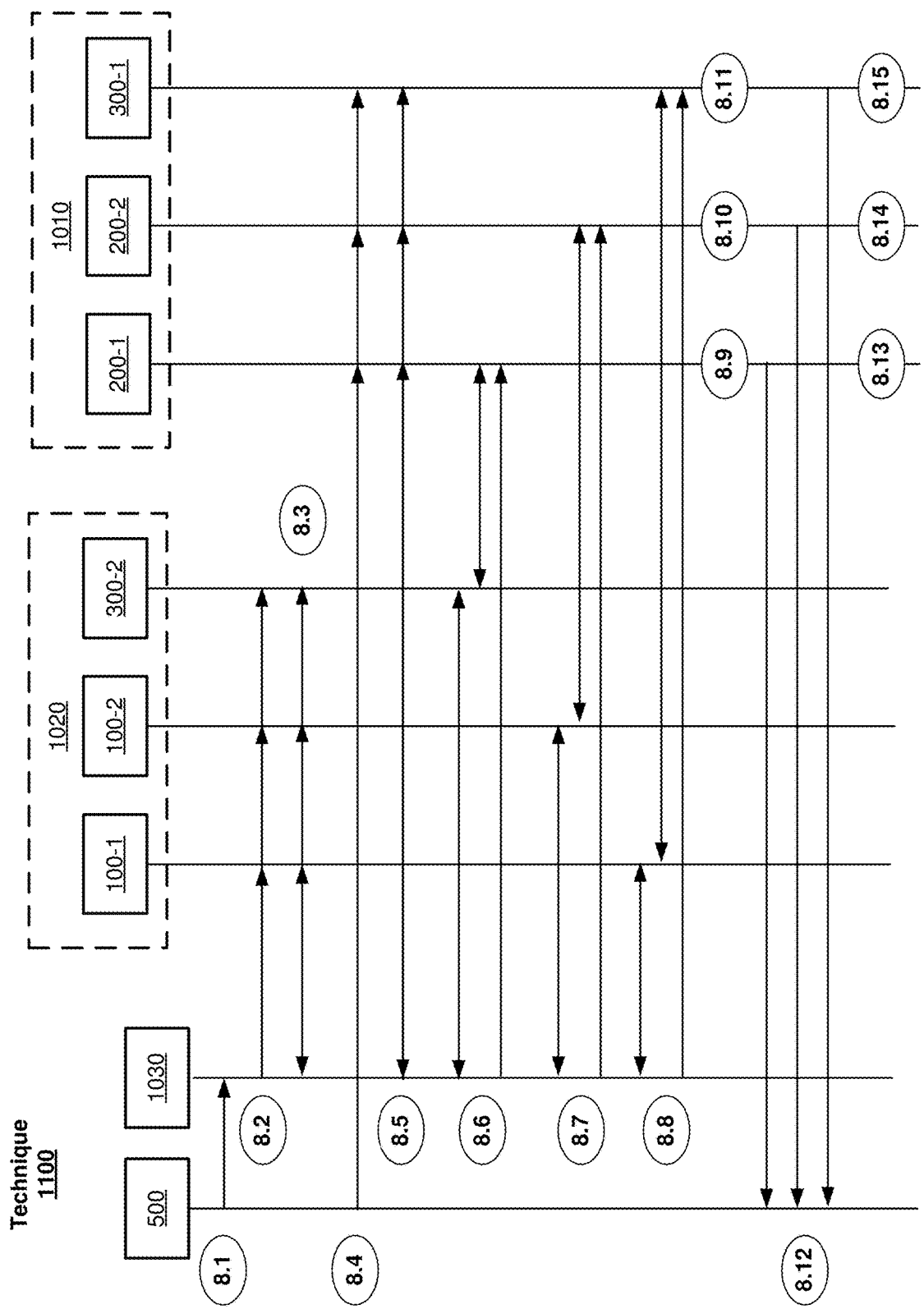
FIG. 8 illustrates a technique according to an embodiment.

Examples portions of the system 1000 are described in greater detail below, in particular, with respect to FIGS. 2-7 example configurations of the system 1000 are provided, while FIG. 8 depicts an example technique implemented by the system 1000. However, a general description of the operation of the system 1000 is provided herein before turning more particularly to these respective figures. In general, the data provider nodes 100-1 to 100-N and the trusted computing & data provider nodes 300-1 to 300-N include private data (e.g., refer to FIGS. 3 and 5) which may be accessed for the purposes of applying some analytic computation on the data using at least some of the trusted computing nodes 200-1 to 200-N and/or the trusted computing & data provider nodes 300-1 to 300-N. More particularly, an experiment may be submitted (e.g., by a researcher, or the like) including a description of the data to be accessed and the computation to be applied to the data through an experiment portal 500. The experiment portal 500 may be untrusted or may be trusted. More specifically, the experiment portal 500 may be a portal accessible via the Internet, even to entities (e.g., researches, or the like) without authority to access the private data. In other examples, the experiment portal 500 may be accessible via a secured process, such as, for example, a private network requiring access credentials. In some examples, the experiment portal 500 may be a web form operably coupled to the system 1000 where entities may submit experiments to the system 1000.

Figure 6:
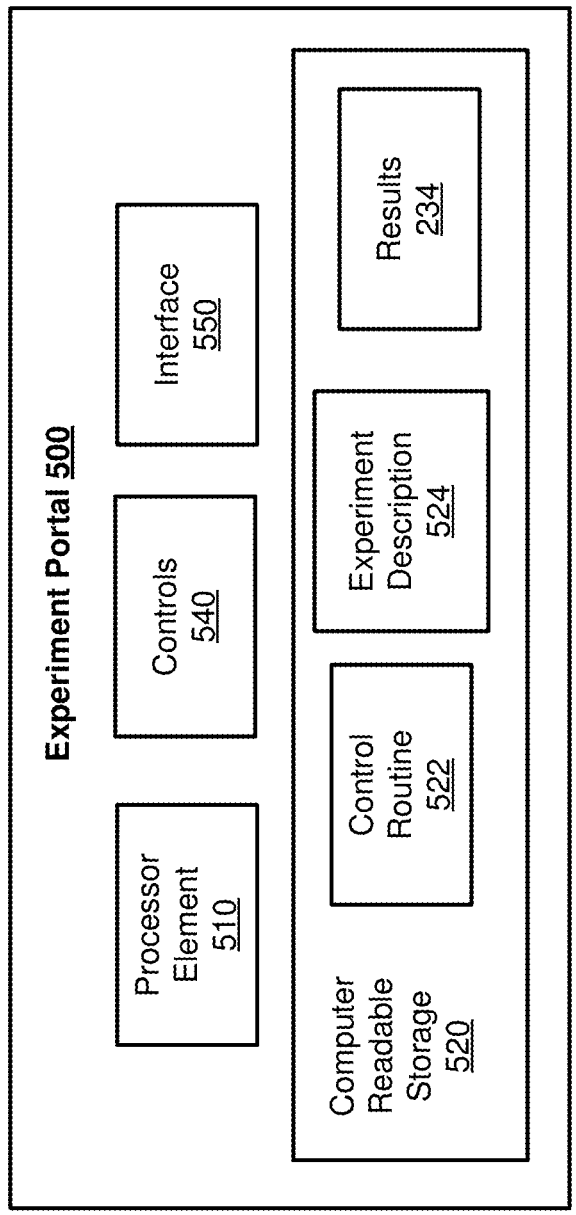

As noted, an experiment may be initiated using the system 1000 by the experiment portal 500 receiving an experiment description (e.g., refer to FIG. 6). In some examples, the experiment description may comprise a directed acyclic graph (DAG). It is noted, a DAG is a directed graph with no directed cycles. More particularly, the DAG is formed by a collection of vertices and directed edges, each edge connecting one vertex to another, such that there is no way to start at some vertex and follow a sequence of edges that eventually loops back to the same vertex again. A DAG may be generated to model the experiment to apply to the private data. More particularly, a collection of tasks (e.g., data processing, database queries, or the like) may be ordered into a sequence subject to various constraints. A DAG may be formed where each vertex of the DAG is a task and each edge is a constraint.

Figure 2:
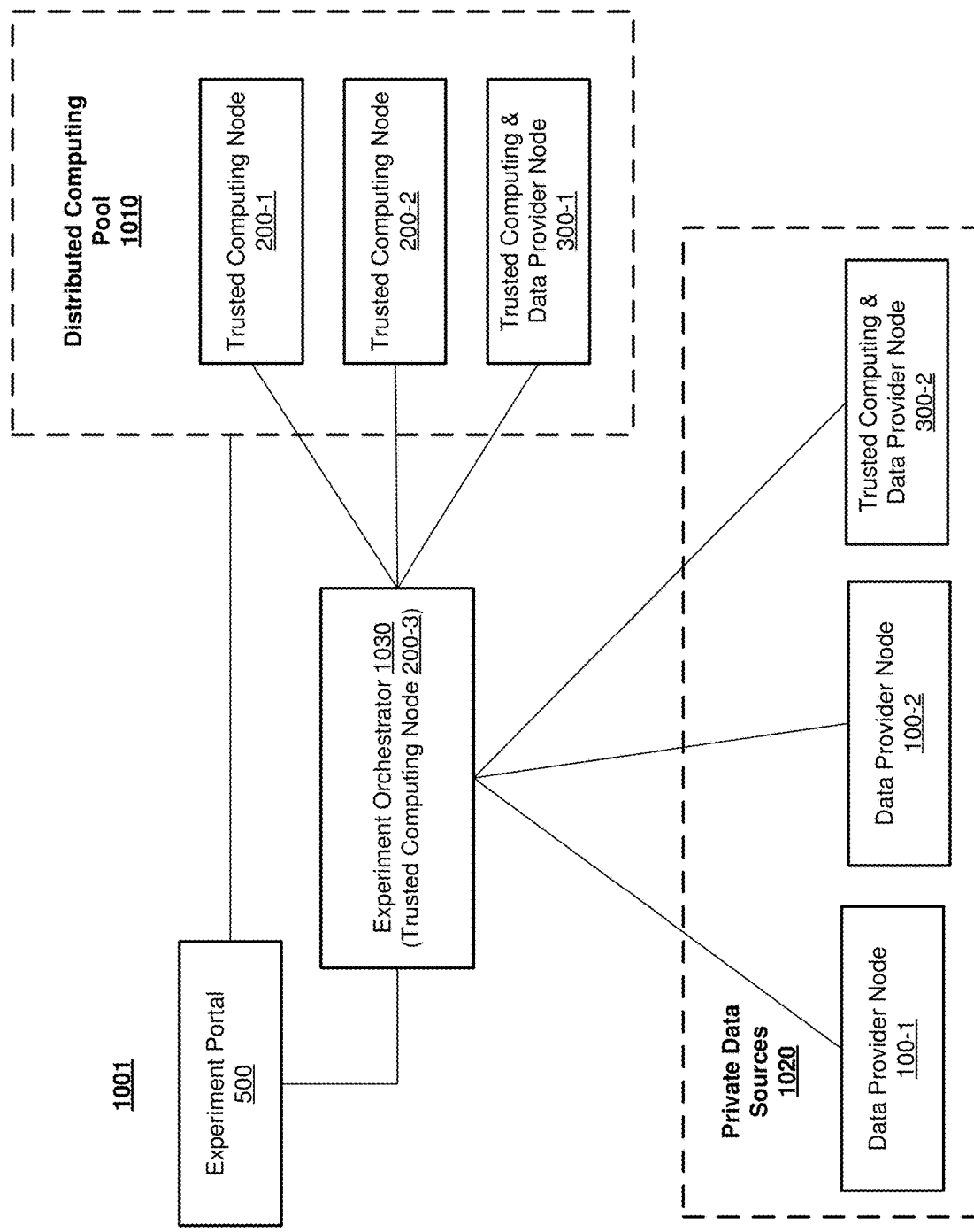
FIG. 2 illustrates a block diagram of an implementation of the system of FIG. 1 according to an embodiment.

The experiment portal 500 may elect one of the trusted computing nodes 200-1 to 200-N or one of the trusted computing & data provider nodes 300-1 to 300-N to act as an experiment orchestrator (e.g., refer to FIG. 2). The experiment orchestrator attests (e.g., to its authenticity, verifies programming, or the like) to each of the data provider nodes 100-1 to 100-N and the trusted computing & data provider nodes 300-1 to 300-N. Additionally, the experiment orchestrator establishes a secure channel with each of the data provider nodes 100-1 to 100-N and with each of the trusted computing & data provider nodes 300-1 to 300-N. The experiment orchestrator submits the DAG to each of the data provider nodes 100-1 to 100-N and the trusted computing & data provider nodes 300-1 to 300-N, for example, via the established secure channel. The data provider nodes 100-1 to 100-N and the trusted computing & data provider nodes 300-1 to 300-N may verify that the DAG describes processing the private data using approved applications and/or calculations. More particularly, in some examples, owners of the private data may require that the private data is processing with specific applications only. As such, the data provider nodes 100-1 to 100-N and the trusted computing & data provider nodes 300-1 to 300-N may verify that the DAG references and/or executes only approved applications.

Once the data provider nodes 100-1 to 100-N and the trusted computing & data provider nodes 300-1 to 300-N approve the DAG, the research portal schedules portions of the experiment description (e.g., applications described in the DAG, or the like) to execute on available trusted computing nodes 200-1 to 200-N and trusted computing & data provider nodes 300-1 to 300-N. In particular, the trusted computing nodes 200-1 to 200-N and trusted computing & data provider nodes 300-1 to 300-N are admitted into a computing pool (e.g., refer to FIG. 2) and given the address of the experiment orchestrator. Each of the trusted computing nodes 200-1 to 200-N and trusted computing & data provider nodes 300-1 to 300-N, as they join the computing pool, may attest to their applications, launch parameters, and root of trust. Accordingly, the experiment orchestrator may authenticate or verify the authenticity of each of the trusted computing nodes 200-1 to 200-N and trusted computing & data provider nodes 300-1 to 300-N admitted to the computing pool. The experiment orchestrator may establish a secure path between the trusted computing nodes 200-1 to 200-N and trusted computing & data provider nodes 300-1 to 300-N in the pool and the data provider nodes 100-1 to 100-N and trusted computing & data provider nodes 300-1 to 300-N supplying private data. In some examples, during setup of this trusted path, the data provider nodes 200-1 to 200-N and trusted computing & data provider nodes 300-1 to 300-N may require the trusted computing nodes 200-1 to 200-N and trusted computing & data provider nodes 300-1 to 300-N to supply proof of their authenticity.

During execution of the experiment description (e.g., the DAG), data is encrypted and transmitted to trusted computing nodes 200-1 to 200-N and trusted computing & data provider nodes 300-1 to 300-N via secure channels. Encryption keys may be distributed directly to trusted computing nodes 200-1 to 200-N and trusted computing & data provider nodes 300-1 to 300-N within the pool needing to decrypt the private data and/or may be distributed to all trusted computing nodes 200-1 to 200-N and trusted computing & data provider nodes 300-1 to 300-N within the compute pool. In some examples, the encryption keys are distributed by the experiment orchestrator. In some examples, the encryption keys are distributed by the data provider nodes 200-1 to 200-N and trusted computing & data provider nodes 300-1 to 300-N. To enhance security of the system 1000, data is stored, decrypted, and applications executed on the data within trusted environments, such as, for example, trusted execution engines. As trusted computing nodes 200-1 to 200-N and trusted computing & data provider nodes 300-1 to 300-N within the computing pool terminate computation and/or leave the computing pool, the encrypted data, the encryption keys, and reported results, are destroyed (e.g., securely removed, or the like).

At the conclusion of the experiment, results may be privacy enhanced to reduce the likelihood that the private data may be revealed through the results of the experiment. In particular, the trusted computing nodes 200-1 to 200-N and trusted computing & data provider nodes 300-1 to 300-N can add noise, encrypt the results, or the like. With some examples, the data provider nodes 200-1 to 200-N and trusted computing & data provider nodes 300-1 to 300-N (e.g., owners of the private data) may specify policies regarding releasing results.

Figure 3:
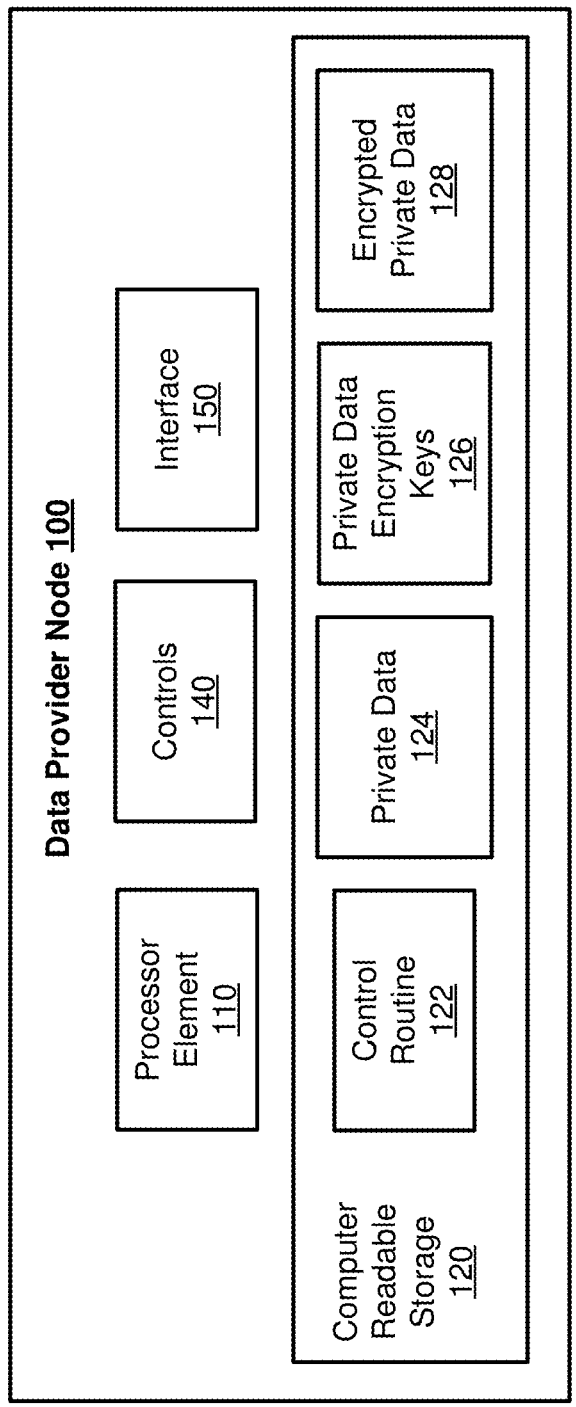
FIGS. 3-6 illustrate block diagrams of portions of the system of FIG. 1 according to various embodiments.
Figure 4:
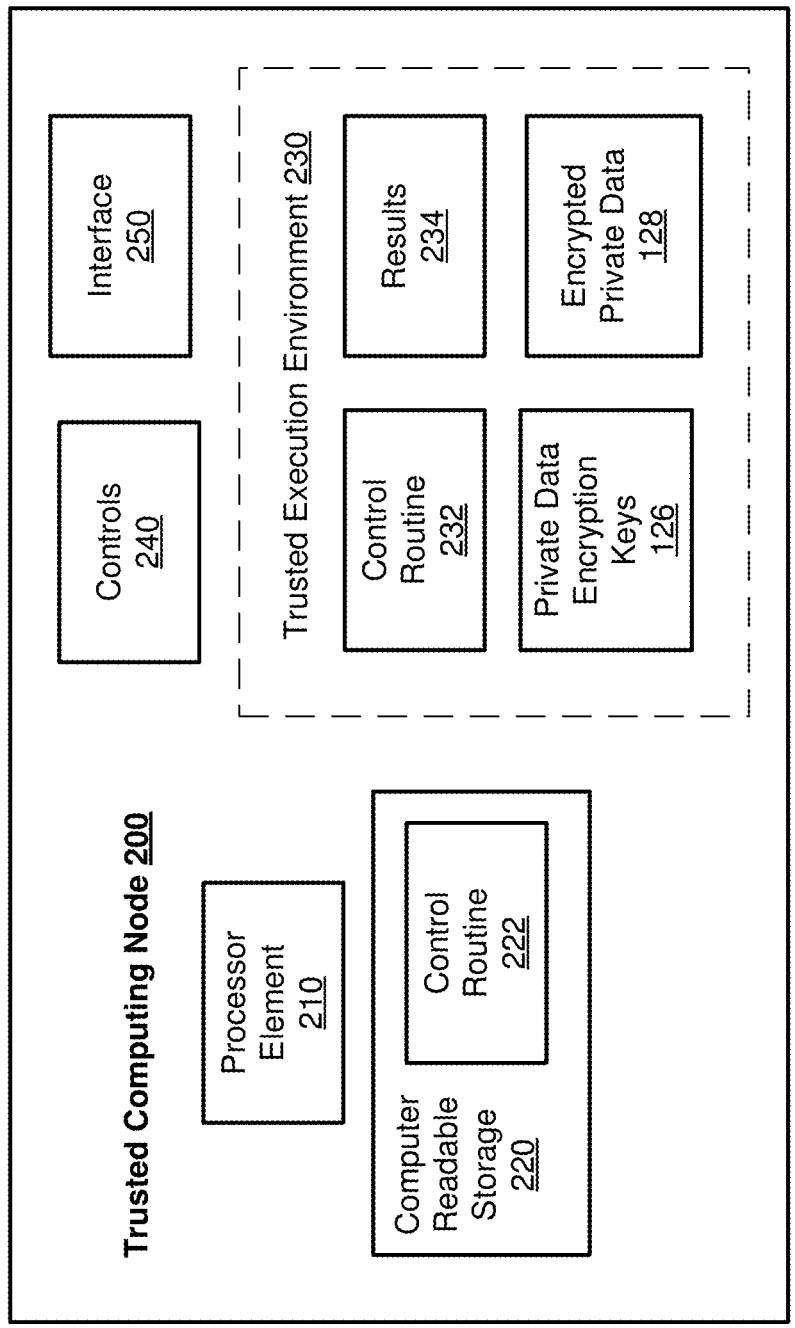
Figure 5:
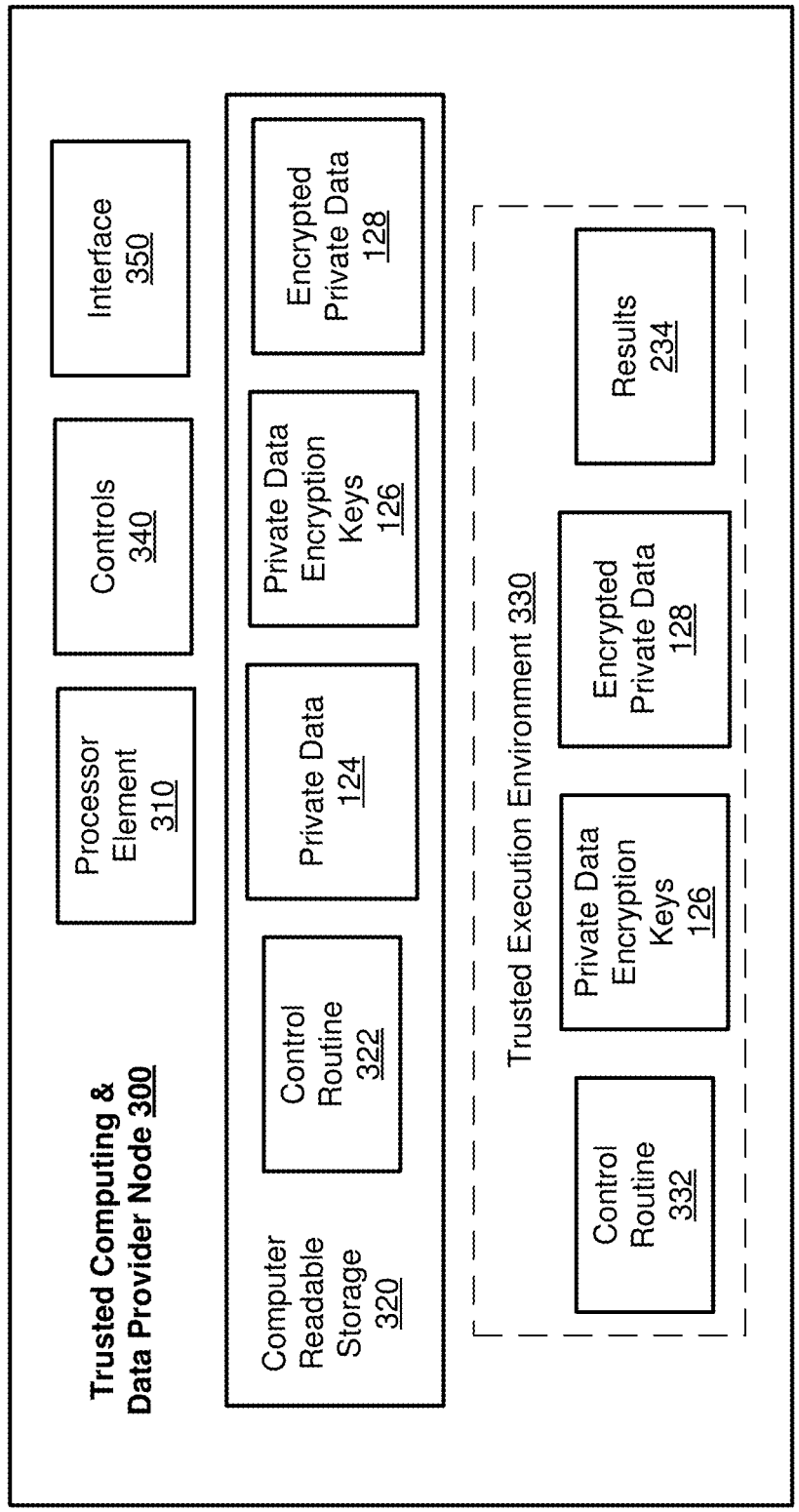

Turning more particularly to FIGS. 2-8, block diagrams are depicted. In particular, FIG. 2 depicts an example implementation of a distributed computing pool and private data sources. FIG. 3 depicts a block diagram of an example of a data provider node 200; FIG. 4 depicts a block diagram of an example of a trusted computing node 200; FIG. 5 depicts a block diagram of an example of a trusted computing & data provider node 300; and FIG. 6 depicts a block diagram of an example of the research portal 500. FIG. 7 depicts a portion of the implementation 1001 depicted in FIG. 2 in greater detail. FIG. 8 depicts a block diagram of a technique for secure distributed processing of multiple sets of private data owned by different entities. A brief description of FIGS. 2-7 is given followed by a description FIG. 8. It is noted, that the example distributed computing pool depicted in FIG. 2 and the technique depicted in FIG. 8 is described with reference to the block diagrams depicted in FIGS. 3-7 for purposes of clarity of explanation and not to be limiting. Furthermore, FIGS. 2-8 are described with reference to the system 1000 shown in FIG. 1. However, this is also done for purposes of clarity of explanation and not to be limiting.

Turning more specifically to FIG. 2, an example implementation 1001 of the system 1000 is depicted. In particular, the example implementation 1001 may include distributed computing pool 1010 and private data sources 1020 is depicted. The distributed computing pool 1010 is depicted including a number of the trusted computing nodes 200-1 to 200-N and the trusted computing & data provider nodes 300-1 to 300-N. In particular, the distributed computing pool 1010 is depicted including trusted computing nodes 200-1 and 200-2 and the trusted computing & data provider node 300-1. The private data sources 1020 is depicted including a number of the data provider nodes 100-1 to 100-N and the trusted computing & data provider nodes 300-1 to 300-N. In particular, the private data sources 1020 is depicted including data provider nodes 100-1 and 100-2 and the trusted computing & data provider node 300-2. Additionally, the example implementation 1001 includes an experiment orchestrator 1030. During operation, upon initiation of an experiment, one of the trusted computing nodes 200-1 to 200-N or one of the trusted computing & data provider nodes 300-1 to 300-N may be act as the experiment orchestrator 1030. It is noted, that the trusted computing node 200-3 is depicted as the experiment orchestrator 1030. However, this is done for purposes of clarity of explanation and not to be limiting. The experiment orchestrator is operably coupled to the distributed computing pool 1010 and the private data sources 1020. Additionally, the experiment orchestrator is operably coupled to the experiment portal 500. Operation of the example implementation 1001 is described in greater detail below with reference to FIG. 8. However, explanation of example portions of the system 1000 are given first, with respect to FIGS. 3-7.

Turning more specifically to FIG. 3, the depicted data provider node 100 may correspond to any one of the data provider nodes 100-1 to 100-N of the system 1000 illustrated in FIGS. 1-2. The data provider node 100 may include a processor element 110, a computer-readable storage 120, controls 140, and an interface 150. The computer-readable storage 120 may store one or more of a control routine 122, private data 124, private data encryption keys 126, and encrypted private data 128.

In general, the control routine 122 incorporates a sequence of instructions operative on the components of the device 100 (e.g., the processor element 110, controls 140, the interface 150, or the like) to implement logic to provide private data 124 for processing as described herein. In particular, in executing the control routine 122, the processing element 110 may receive a request to execute an experiment using private data 124. The processor element 110 may verify that the experiment includes authorized actions (e.g., applications, operations, or the like) over the private data 124. Additionally, the processor element 110 may encrypt the private data 124 to form encrypted private data 128, for example, using the private data encryption keys 126. The processor element 110 may provide the encrypted private data 128 to one of the trusted computing nodes 200-1 to 200-N and/or one of the trusted computing & data provider nodes 300-1 to 300-N and may provide the encryption keys 126 to the experiment orchestrator. As such, the data provider nodes 100 may facilitate distributed processing on private data 124, where the distributed processing operates over multiple sets of private data (e.g., private data 124-1 to private data 124-N, or the like) owned by multiple distrustful entities.

In general, the private data 124 may be any data where distributed processing is desired. For example, the private data may be medical data, economic data, financial data, historical data, business data, demographic data, or the like.

Turning more specifically to FIG. 4, the depicted trusted computing node 200 may correspond to any one of the trusted computing nodes 200-1 to 200-N of the system 1000 illustrated in FIGS. 1-2. The trusted computing node 200 may include a processor element 210, a computer-readable storage 220, a trusted execution environment (TEE) 230, controls 240, and an interface 250. The computer-readable storage 220 may store one or more of a control routine 222 while the trusted execution environment 230 may store one or more of control routine 232, results 234, private data encryption keys 126, and encrypted private data 128.

In general, the control routine 222 incorporates a sequence of instructions operative on the components of the device 200 (e.g., the processor element 210, the TEE 230, the controls 240, the interface 250, or the like) to implement logic to provide for the secure distributed processing of private data sets (e.g., the private data 124). Furthermore, the control routine 232 incorporates a sequence of instructions operative on the components of the device 200 (e.g., the processor element 210, the controls 240, the interface 250, or the like) to implement logic to decrypt encrypted private data 128 and to apply various computing operations over the decrypted private data.

It is important to note, that the TEE 230 may comprise logic, functions, features, and/or storage to securely implement the functions described herein. Additionally, the TEE 230 may be incorporated into the processor element 210 and/or the storage 220. However, for purposes of clarity, the TEE 230 is depicted separate from the processor element 210 and the storage 220. In some examples, the TEE 230 may be implemented as a secure enclave, a secure co-processor, or the like. As such, the trusted computing node 200 may attest to it's ability to securely decrypt, store, and process private data 124.

In executing the control routine 232, the processing element 210 may join a computing pool and may attest to it's authenticity to an experiment orchestrator. The processing element 210 may receive information element(s) from the experiment orchestrator to include an indication of operations (e.g., portions of a DAG, or the like) to apply over private data 124. The processor element 210 may receive information element(s) to include indications of encrypted private data 128 (e.g., from one of the private data sources 1030). Additionally, the processor element 210 may receive information element(s) from the experiment orchestrator to include indications of private data encryption keys 126 corresponding to the received encrypted private data 128.

In executing the control routine 232, the processor element 210 may apply the operations described in the portions of the experiment (e.g., the DAG) received from the experiment orchestrator to the received private data. Said differently, the processor element 210 may generate results 234 based at least in part on processing the private data (e.g., by decrypting the encrypted private data 128 using private data encryption keys 126, or the like) as indicated in the portion of the DAG received by the trusted computing node 200. Additionally, the processor element may obscure the results 234 (e.g., by adding noise, or the like) to reduce the possibility of identifying the private data based on the results 234.

Turning more specifically to FIG. 5, the depicted trusted computing & data provider node 300 may correspond to any one of the trusted computing & data provider nodes 300-1 to 300-N of the system 1000 illustrated in FIGS. 1-2. It is noted, that the trusted computing node 300 may be a combination of the nodes 100 and 200 described with respect to FIGS. 3-4. In particular, the trusted computing & data provider node 300 may either provide private data (e.g., similarly to the node 100) or may process private data (e.g., similarly to the node 200). With some examples, the node 300 may either provide or process private data. With some examples, the node 300 may both provide and process private data. In particular, as the processing of the private data is confined to the TEE, the security of the private data may be maintained even where the private data processed is owned by a different entity.

The node 300 may include a processor element 310, a computer-readable storage 320, a TEE 330, controls 340, and an interface 350. The computer-readable storage 320 may store one or more of a control routine 322, private data 124, private data encryption keys 126, and encrypted private data 128. The TEE 330 may include one or more of control routine 332, results 234, private data encryption keys 126, and encrypted private data 128.

In general, the control routine 322 incorporates a sequence of instructions operative on the components of the device 300 (e.g., the processor element 310, controls 340, the interface 350, or the like) to implement logic to provide private data 124 for processing as described herein. In particular, in executing the control routine 322, the processing element 310 may receive a request to execute an experiment using private data 124. The processor element 310 may verify that the experiment includes authorized actions (e.g., applications, operations, or the like) over the private data 124. Additionally, the processor element 310 may encrypt the private data 124 to form encrypted private data 128, for example, using the private data encryption keys 126. The processor element 310 may provide the encrypted private data 128 to one of the trusted computing nodes 200-1 to 200-N and/or one of the trusted computing & data provider nodes 300-1 to 300-N and may provide the encryption keys 126 to the experiment orchestrator.

In general, control routine 332 incorporates a sequence of instructions operative on the components of the device 300 (e.g., the processor element 310, the controls 340, the interface 350, or the like) to implement logic to decrypt encrypted private data 128 and to apply various computing operations over the decrypted private data.

It is important to note, that the TEE 330 may comprise logic, functions, features, and/or storage to securely implement the functions described herein. Additionally, the TEE 330 may be incorporated into the processor element 310 and/or the storage 320. However, for purposes of clarity, the TEE 330 is depicted separate from the processor element 310 and the storage 320. In some examples, the TEE 330 may be implemented as a secure enclave, a secure co-processor, or the like. As such, the node 300 may attest to it's ability to securely decrypt, store, and process private data 124.

In executing the control routine 332, the processing element 310 may join a computing pool and may attest to it's authenticity to an experiment orchestrator. The processing element 310 may receive information element(s) from the experiment orchestrator to include an indication of operations (e.g., portions of a DAG, or the like) to apply over private data 124. The processor element 310 may receive information element(s) to include indications of encrypted private data 128 (e.g., from one of the private data sources 1030). Additionally, the processor element 310 may receive information element(s) from the experiment orchestrator to include indications of private data encryption keys 126 corresponding to the received encrypted private data 128.

In executing the control routine 332, the processor element 310 may apply the operations described in the portions of the experiment (e.g., the DAG) received from the experiment orchestrator to the received private data. Said differently, the processor element 310 may generate results 234 based at least in part on processing the private data (e.g., by decrypting the encrypted private data 128 using private data encryption keys 126, or the like) as indicated in the portion of the DAG received by the node 300. Additionally, the processor element 310 may obscure the results 234 (e.g., by adding noise, or the like) to reduce the possibility of identifying the private data based on the results 234.

Turning more specifically to FIG. 6, an example of the depicted experiment portal 500 is depicted. The experiment portal 500 may include a processor element 510, a computer-readable storage 520, controls 540, and an interface 550. The computer-readable storage 520 may store one or more of a control routine 522, experiment description 524 and results 234.

In general, the control routine 522 incorporates a sequence of instructions operative on the components of the device 500 (e.g., the processor element 510, controls 540, the interface 550, or the like) to implement logic to receive the experiment description 524 (e.g., from a researcher device, or the like). The processor element 510 may select one of the trusted computing nodes 200-1 to 200-N to act as the experiment orchestrator 1030 and may communicate the experiment description 524 to the experiment orchestrator 1030. Additionally, in executing the control routine 532, the processor element 510 may schedule portions of the experiment description 524 to operate on available nodes within the distributed computing pool 1010. In general, the experiment description may be any description to include indications of the private data 124 to be accessed and the operations to be performed on the private data. In some examples, the experiment description will be a DAG referencing the private data 124 and various map functions, reduce functions, analytic functions, or the like.

The device 100, 200, 300, and/or 500 may be any of a variety of types of computing devices, including without limitation, a server, a workstation, a data center, a laptop computer, an Ultrabook® computer, a tablet computer, a smart phone, or the like.

In various embodiments, the processor elements 110, 210, 310, and/or 510 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor elements 110, 210, and/or 410 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, the storage 120, 220, 320, and/or 520 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the control routines 122, 222, 232, 322, 332, and/or 522 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor elements (e.g., 110, 210, 310, 510, or the like). Where one or more device drivers are included, those device drivers may provide support for any of a variety of other components, whether hardware or software components, of the devices.

In various embodiments, the controls 140, 240, 340, and/or 540 may be any of a variety of input and/or output devices, such as, for example, a touch screen, a keyboard, a mouse, a keypad, a trackpad, a stylus, a display, a speaker, a haptic feedback device, or the like. The controls may be local or remote and may be connected wirelessly or wired.

In various embodiments, the interfaces 150, 250, 350, and/or 550 may employ any of a wide variety of signaling technologies enabling the components to be coupled through network 400. In particular, the devices 100, 200, 300, and/or 500 may exchange signals (e.g., with each other, with another device, or the like) conveying information and/or data associated with the private data 124 and the results 234.

In various embodiments, the network 400 may be a single network possibly limited to extending within a single building or other relatively limited area, a combination of connected networks possibly extending a considerable distance, and/or may include the Internet. Thus, the network 400 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the interfaces 150, 250, 350, and/or 550 may include circuitry providing at least some of the requisite functionality to enable such coupling. However, the interfaces 150, 250, 350, and/or 550 may also be at least partially implemented with sequences of instructions executed by the processor elements (e.g., to implement a protocol stack or other features). Where one or more portions of the network 400 employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 400 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Turning more particularly to FIG. 7, a portion of the example 1001 of FIG. 2 is depicted in greater detail. As show, the experiment orchestrator 1030 may correspond to the trusted computing node 200-3, which may include the control routine 232 and/or other logic, at least a portion of which may be implemented in hardware, which may comprise an attestation engine 2321, a secure channel interface 2322, an experiment authenticator 2323, and a computing node authenticator 2324. A computing node from the distributed computing pool 1010 is depicted. For example, the trusted computing node 200-1 is depicted, which may include the control routine 232 and/or other logic, at least a portion of which may be implemented in hardware, which may include the attestation engine 2321, the secure channel interface 2322, and an experiment processor 2325. A data provider node from the private data sources 1020 is depicted. For example, the data provider node 100-1 is depicted, which may include the control routine 122 and/or other logic, at least a portion of which may be implemented in hardware, which may include a gateway component 1221, an experiment validator 1222, and an encryption engine 1223. The experiment portal 500 is also depicted, which may include the control routine 522 and/or other logic, at least a portion of which may be implemented in hardware, which may include a scheduler 5221. Furthermore, secure channel 710-1 is depicted established between the secure channel interfaces 2322 of the nodes 200-1 and 200-3 and secure channels 710-2 and 710-3 are depicted between each of the secure channel interfaces of the nodes 200-1 and 200-3 and the gateway 1221 of the node 100-1.

Turning more particularly to FIG. 8 the technique 1100 for securely processing multiple sets of data owned by different entities using a distributed pool of computing resources is depicted. The technique includes operations or blocks 8.X, where X is a positive integer. Beginning at block 8.1, the experiment portal may receive an experiment description. For example, the experiment transceiver 5221 may receive information element(s) to include an indication of the experiment description 524. The Additionally, at block 8.1, the experiment transceiver 5221 select one of the computing nodes (e.g., the trusted computing nodes 200-1 to 200-N or the trusted computing & data provider nodes 300-1 to 300-N) to act as the experiment orchestrator 1030. For example, the experiment transceiver 5221 may select the trusted computing node 200-3 to act as the experiment orchestrator 1030. Furthermore, at block 8.1, the experiment transceiver 5221 may send an information element to include an indication of the experiment description to the experiment orchestrator 1030.

At block 8.2, the experiment orchestrator 1030 may attest to the data provider nodes of the private data sources 1020 of it's authenticity and ability to act as the experiment orchestrator. For example, the attestation engine 2321 may attest to the nodes 100-1, 100-2, and 300-2. Continuing to block 8.3, the experiment orchestrator establishes a trusted communication channel (e.g., a secure out-of-bounds channel, a hardened communication channel, or the like) with the nodes in the private data provider pool 1020. For example, the secure channel interface 2322 may establish a secure channel with each of the gateways 1221 of the data provider nodes 100-1, 100-2, and 300-2.

Continuing to block 8.3, the experiment orchestrator may send an information element to include an indication of the experiment description (e.g., the workflow DAG, or the like) to the nodes of the private data sources 1020 on the established secure channel. For example, the experiment authenticator 2323 may communicate the experiment description 524 to the data provider nodes over a secure channel, and more particularly, via the secure channel interface 2322 and the gateway 1221. Furthermore, at block 8.3, the nodes of the private data sources 1020 (e.g., the nodes 100-1, 100-2, and 300-2) may verify that the experiment description 524 describes only approved workflows. For example, the nodes may verify that the experiment description references approved applications, processes, operations, transformations, or the like.

Continuing to block 8.4, the experiment portal 500 may schedule the distributed computing based on the experiment description 524. For example, the scheduler 5222 may schedule ones of the nodes in the pool 1010 to execute individual portions of the experiment description 524. At block 8.4, the experiment processor 2325 may receive an information element (e.g., from the scheduler 5222) to include an indication of the address of the experiment orchestrator 1030, an indication of the private data needed, and an indication of the operations to be performed on the private data. In some examples, scheduling may be based at least in part on nearness to data, resource availability, or the like.

Continuing to block 8.5, the experiment orchestrator 1030 may admit nodes to the distributed computing pool 1010 and/or may authenticate the nodes in the pool 1010. For example, the computing node authenticator 22324 may receive an information element from a node in the pool 1010 or a node requesting admission to the pool 1010, the information element to include an indication an authenticity of the node. For example, the attestation engine 2321 if the node 200-1 may communicate with the computing node authenticator 2324 of the node 200-3 (e.g., experiment orchestrator) to attest to its applications, launch parameters, root of trust, or the like. The secure channel interface 2322 of the nodes 200-3 may facilitate establishing a secure channel between the source channel interface 2322 of the nodes 200-1 and the gateway 1221. More particularly, the experiment orchestrator 1030 may facilitate establishing secure channels between the nodes in the pool 1010 and the source nodes 1020.

Continuing to blocks 8.6, 8.7, and 8.8, a node in the pool 1010 may receive encrypted private data from one of the nodes in the sources 1020 and may receive encryption keys to operate decrypt the encrypted private data. For example, at block 8.6, the experiment processor 2325 of the node 200-1 may receive encrypted private data 128 from the node 300-2. In some examples, the encrypted private data 128 is received over a secure channel (e.g., via the secure channel interface 2322 and the gateway 1221, or the like). At block 8.7, the experiment processor 2325 of the node 200-2 may receive encrypted private data 128 from the node 100-2. In some examples, the encrypted private data 128 is received over a secure channel (e.g., via the secure channel interface 2322 and the gateway 1221, or the like). At block 8.8, the experiment processor 2325 of the node 300-1 may receive encrypted private data 128 from the node 100-1. In some examples, the encrypted private data 128 is received over a secure channel (e.g., via the secure channel interface 2322 and the gateway 1221, or the like).

With some examples, the private data encryption keys 126 are provided to the nodes by the experiment orchestrator 1030. For example, at blocks 8.6, 8.7, and 8.8, the experiment orchestrator may provide the appropriate encryption keys to the nodes in the pool 1010 and the nodes in sources 1020 via a secure channel (e.g., via the secure channel interface 2322 and the gateway 1221, or the like). In some examples, the private data encryption keys 126 are provide by the data sources. For example, the data source may provide the encryption keys over a secure channel to the node requesting private data.

Continuing to blocks 8.9, 8.10, and 8.11, the nodes in the pool may process the received private data. For example, at blocks 8.9, 8.10, and 8.11, the experiment processor, of each of the nodes, may decrypt the received private data and may apply the various processes (e.g., map, reduce, analytic, or the like) indicated in the portion of the experiment description received from the scheduler at block 8.4. Additionally, at blocks 8.9, 8.10, and 8.11, the experiment processor of each of the nodes may generate results 234.

It is important to note, that the nodes in the pool 1010 may isolate the processing of the received private data. More particularly, each node may isolate the execution related to processing the private data from all other instances executing on that node and/or from all other instances executing in the pool 1010.

It is noted, that blocks 8.9, 8.10, and 8.11 may require intermediate results and/or private data as part of the processing at blocks 8.9, 8.10, and 8.11. Said differently, some of the results 234 may be intermediate results and not final results that are delivered to the experiment portal. Accordingly, at blocks 8.9, 8.10, and 8.11, the nodes in the pool may encrypt the results 234 for communication to another node in the system or for further processing (e.g., by another application, or the like) on the same node.

Continuing to block 8.12, the experiment portal 500 may receive results from nodes in the pool. In some examples, the node in the pool may apply (e.g., at blocks 8.9, 8.10, 8.11, or the like) de-identification techniques on the results 234. For example, the results 234 may have noise added to them to reduce the chance of identifying the private data 124 from the results.

Continuing to blocks 8.13, 8.14, and 8.15, the nodes in the pool 1010 may destroy (e.g., erase, overwrite, or the like) the results 234, the encrypted private data 128, and the encryption keys 126.

Figure 9:
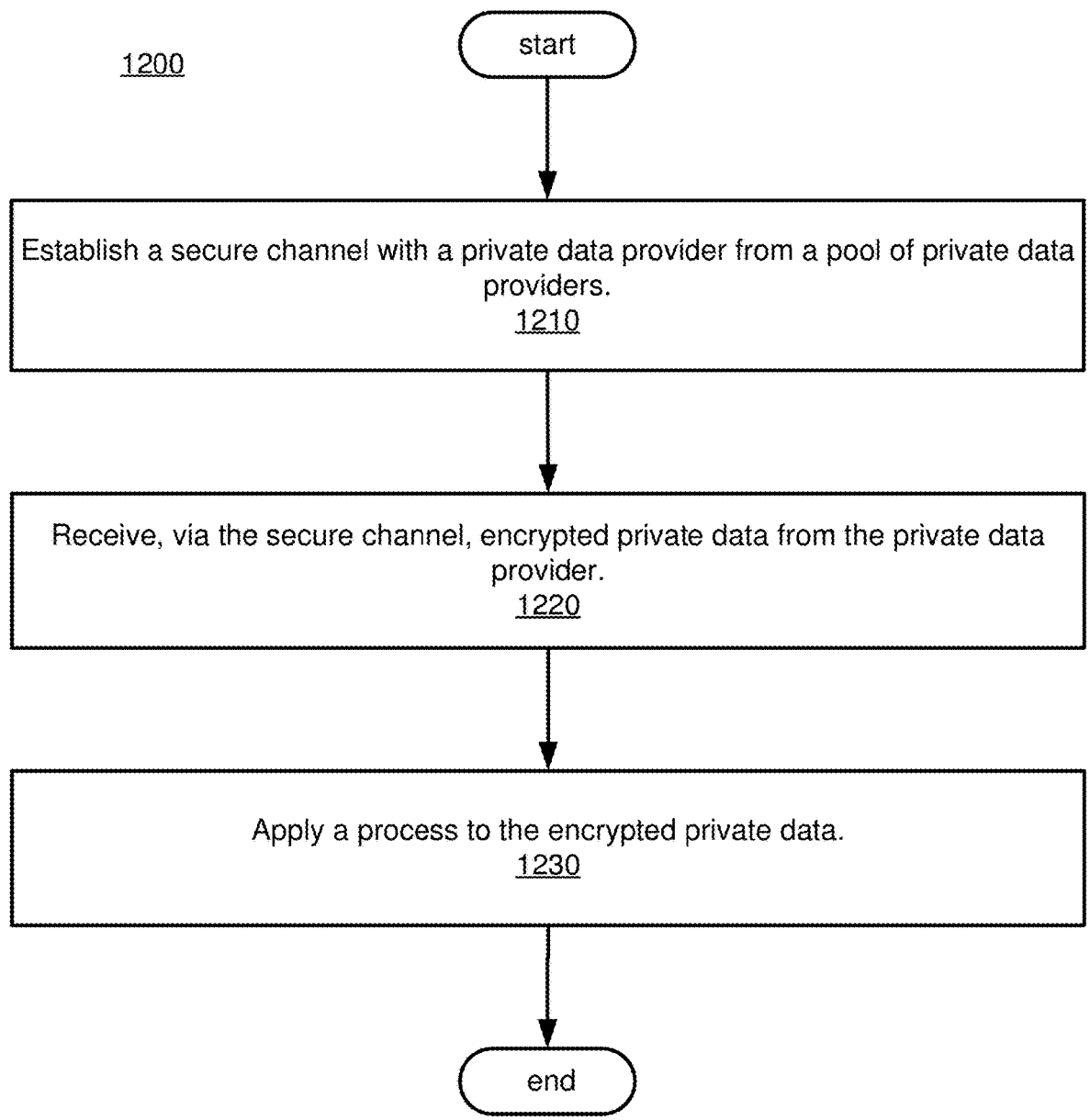
FIGS. 9-10 each illustrate logic flows according to various embodiments.
Figure 10:
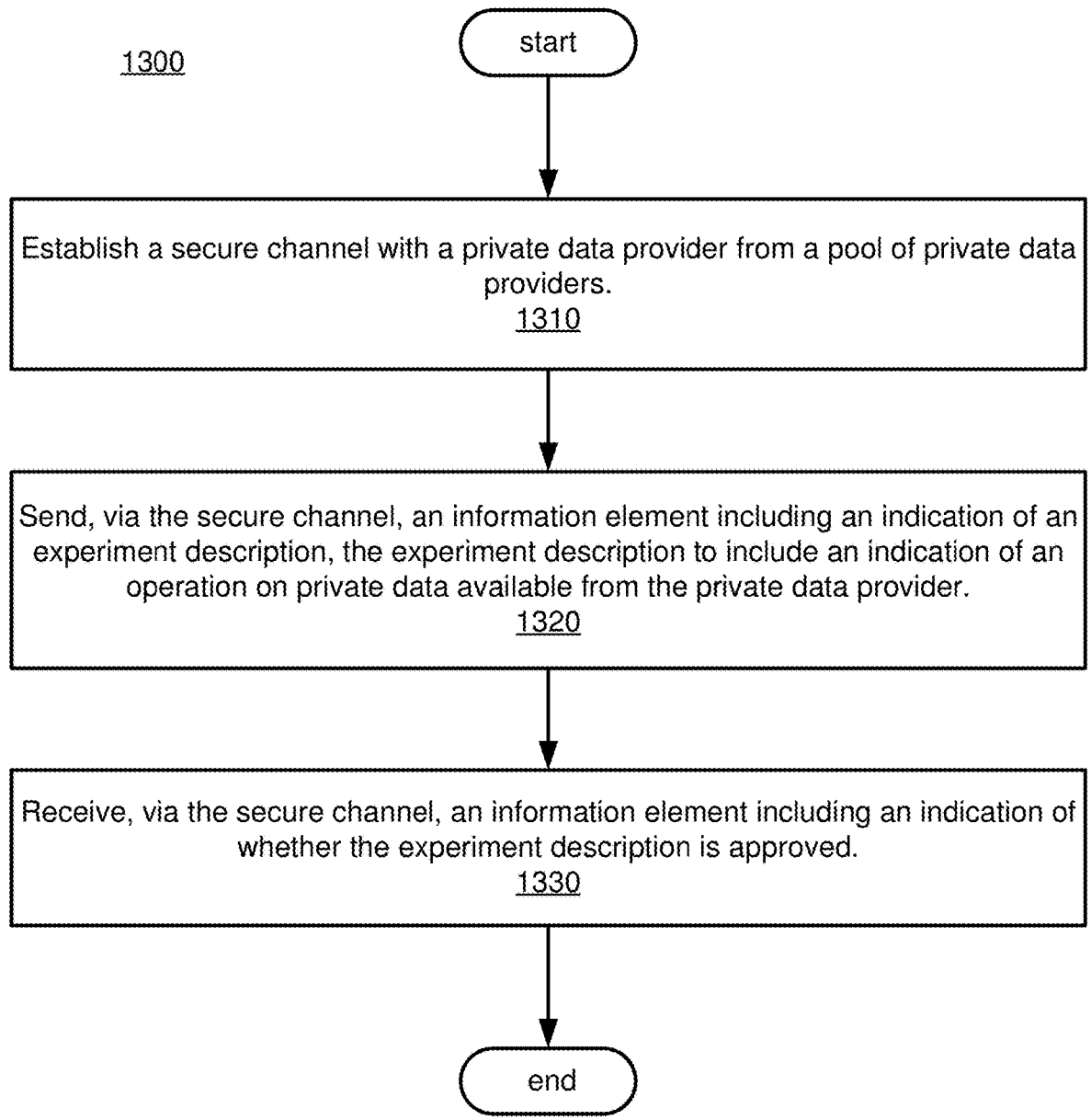

FIGS. 9-10 illustrate embodiments of logic flows for providing for mutual approval of distributed processing of multi-party data. For example, the logic flows may be implemented to provide for the mutual approval of processing the data from the private data sources 1020 by the distributed pool 1010. It is to be appreciated, that the logic flows are described with reference to FIGS. 1-8. However, examples are not limited in this context and in particular, systems and/or devices including similar or different component to those depicted in FIGS. 1-8 may implement the logic flows.

Turning more specifically to FIG. 9, the logic flow 1200 may begin at block 1210. At block 1210, "establish a secure channel with a private data provider from a pool of private data providers," the control routine 232 may establish a secure channel (e.g., secure channel 710-2, or the like) between the node (e.g., a node of the pool 1010) and a data provider in the pool 1020. More specifically, the secure channel interface 2322 of the node may establish the secure channel 710-2 with the gateway 1221.

Continuing to block 1220, "receive, via the secure channel, encrypted data from the private data provider," the node may receive encrypted private data 128 from the node in the private data pool, via the secure channel. For example, the experiment processor 2325 of the node in the pool 1010 may receive private data 128 via the secure channel 710-2.

Continuing to block 1230, apply a process to the encrypted data," the node may apply a process to the encrypted data. More specifically, the experiment processor 2325 of the node in the pool 1010 may apply a process (e.g., based on the experiment description, the DAG, or the like) to the encrypted private data.

Turning more specifically to FIG. 10, the logic flow 1300 is depicted. The logic flow 1300 may begin at block 1310. At block 1310, "establish a secure channel with a private data provider from a pool of private data providers," the control routine 232 of the experiment orchestrator 1030 may establish a secure channel (e.g., secure channel 710-3, or the like) between the experiment orchestrator 1030 and the data providers in the pool 1020. More specifically, the secure channel interface 2322 of the experiment orchestrator 1030 may establish the secure channel 710-3 with the gateway 1221. Likewise, the secure channel interface 2322 may establish other secure channels with other gateways of corresponding data providers in the pool 1020.

Continuing to block 1320, "send, via the secure channel, an information element including an indication of an experiment description, the experiment description to include an indication of an operation on private data available from the private data provider," the control routine 232 of the experiment orchestrator 1030 may send, via the secure channel 710-3 or the like, an information element to the private data provider (e.g., the private data provider 100-1, or the like) including an indication of the experiment description 524.

Continuing to block 1330, "receive, via the secure channel, an information element including an indication of whether the experiment description is approved," the control routine 232 of the experiment orchestrator 1030 may receive an information element from the private data provider (e.g., the data provider 100-1, or the like) including an indication of whether the experiment description 524 is approved or authorized to operate on the private data 124 available from the private data provider.

Figure 11:
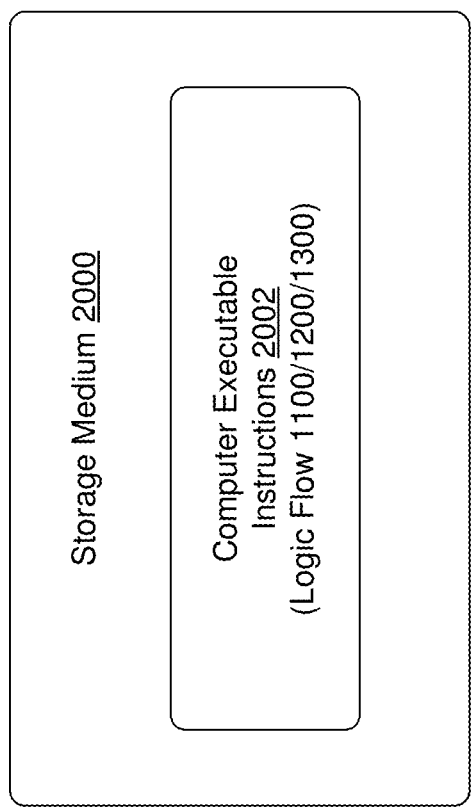
FIG. 11 illustrates an embodiment of computer-readable storage medium.

FIG. 11 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
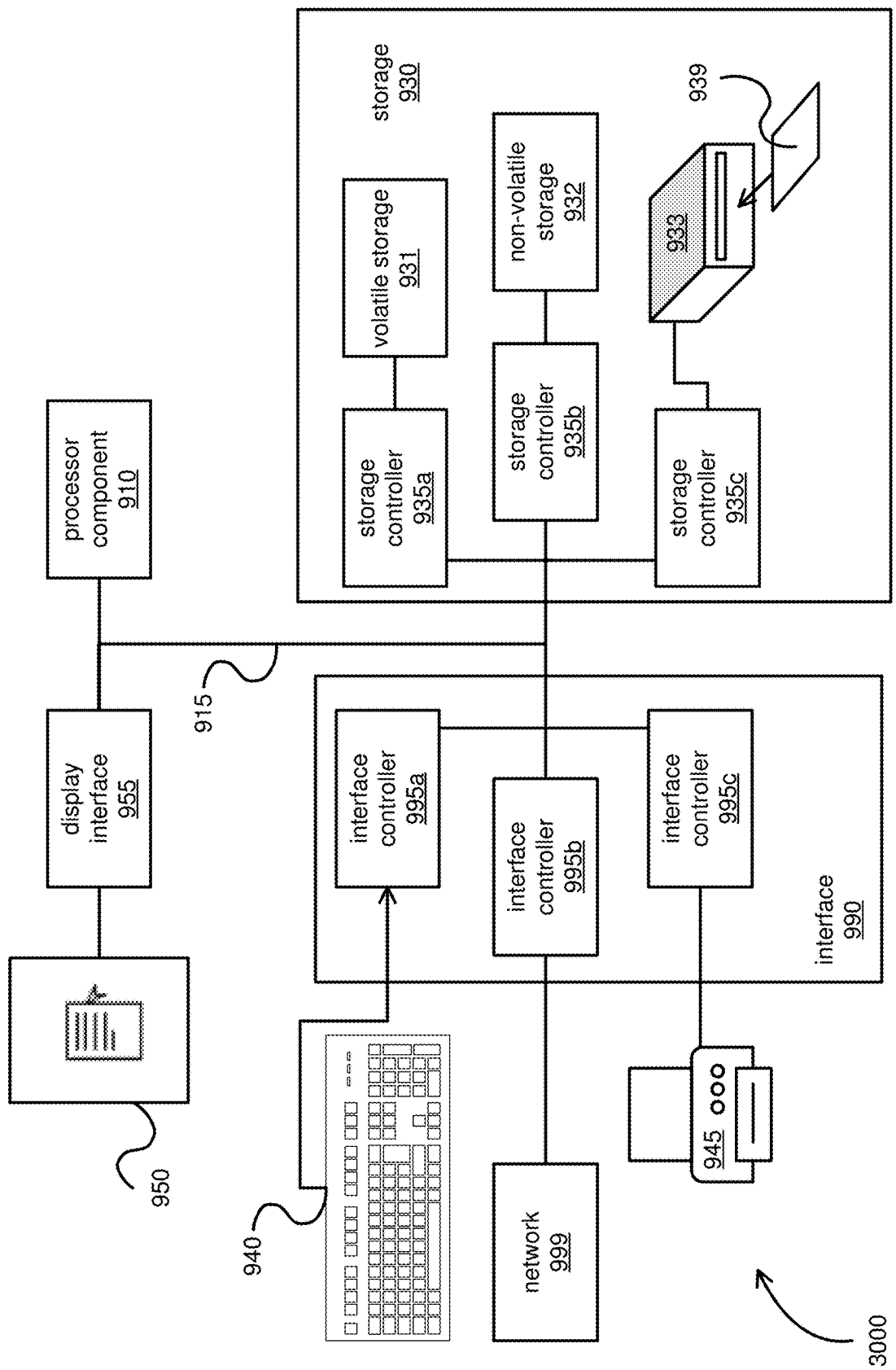
FIG. 12 illustrates an embodiment of a processing architecture.

FIG. 12 illustrates an embodiment of an exemplary processing architecture 3000 suitable for implementing various embodiments as previously described. More specifically, the processing architecture 3000 (or variants thereof) may be implemented as part of the system 1000 and/or the devices 100, 200, 300, and/or 500 described herein.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length above, for the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1

An apparatus, comprising: logic, a portion of which is implemented in hardware, the logic to comprise: a secure channel interface to establish a secure channel with a private data provider of a plurality of private data providers in a pool of private data sources; and an experiment processor to: receive, via the secure channel, encrypted private data from the private data provider; apply one or more processes to the encrypted private data.

Example 2

The apparatus of example 1, the experiment processor to receive encryption keys and to decrypt the encrypted private data based on the encryption keys.

Example 3

The apparatus of example 2, the secure channel a first secure channel, the secure channel interface to establish a second secure channel with an experiment orchestrator, the experiment processor to receive the encryption keys from the experiment orchestrator.

Example 4

The apparatus of example 1, comprising an attestation engine to send an information element to an experiment orchestrator to include an indication of a root of trust of the apparatus.

Example 5

The apparatus of example 1, the apparatus a trusted computing node in a pool of distributed trusted computing nodes.

Example 6

The apparatus of example 2, the experiment processor to receive an information element from an experiment orchestrator, the information element to include an indication of a portion of an experiment description.

Example 7

The apparatus of example 6, the experiment processor to receive the encryption keys from the private data provider.

Example 8

The apparatus of example 7, the experiment description comprising a directed acyclic graph (DAG).

Example 9

The apparatus of example 8, the DAG comprising a plurality of map, reduce, or analytic operations to be performed on private data, the private data corresponding to private data available from the plurality of private data providers in the pool of private data sources.

Example 10

The apparatus of any one of examples 1 to 9, the secure channel interface and the experiment processor to execute in a trusted execution environment.

Example 11

An apparatus, comprising: logic, a portion of which is implemented in hardware, the logic to comprise: a secure channel interface to establish a secure channel with a private data provider of a plurality of private data providers in a pool of private data sources; and an experiment authenticator to: send, via the secure channel, a first information element to the private data provider, the first information element to include an indication of an experiment description that operates on private data available from the private data source; receive, via the secure channel, a second information element from the private data provider, the second information element to include an indication of whether the experiment description is approved.

Example 12

The apparatus of example 11, the logic comprising a computing node authenticator, the computing node authenticator to authenticate a trusted computing node to admit the trusted computing node to a pool of trusted computing nodes.

Example 13

The apparatus of example 12, the computing node authenticator to receive a root of trust from the trusted computing node and to authenticate the trusted computing node based on the root of trust.

Example 14

The apparatus of example 12, the computing node authenticator to: send, via the secure channel, a third information to the private data provider, the third information element to include an indication of the authenticity of the trusted computing node; and receive, via the secure channel, a fourth information element from the private data provider, the fourth information element to include an indication of whether the trusted computing node is authorized to receive the private data.

Example 15

The apparatus of example 12, the experiment authenticator to receive a third information element from an experiment portal, the third information element to include an indication of the experiment description.

Example 16

The apparatus of example 12, the experiment description a directed acyclic graph.

Example 17

An apparatus, comprising: a trusted execution environment (TEE); a secure channel interface for execution by the TEE, the secure channel interface to establish a secure channel with a private data provider of a plurality of private data providers in a pool of private data sources; and an experiment processor for execution by the TEE, the experiment processor to: receive, via the secure channel, encrypted private data from the private data provider; apply one or more processes to the encrypted private data.

Example 18

The apparatus of example 17, the experiment processor to receive encryption keys and to decrypt the encrypted private data based on the encryption keys.

Example 19

The apparatus of example 18, the secure channel a first secure channel, the secure channel interface to establish a second secure channel with an experiment orchestrator, the experiment processor to receive the encryption keys from the experiment orchestrator.

Example 20

The apparatus of example 17, comprising an attestation engine to send an information element to an experiment orchestrator to include an indication of a root of trust of the apparatus.

Example 21

The apparatus of example 17, the apparatus a trusted computing node in a pool of distributed trusted computing nodes.

Example 22

The apparatus of example 18, the experiment processor to receive an information element from an experiment orchestrator, the information element to include an indication of a portion of an experiment description.

Example 23

The apparatus of example 22, the experiment processor to receive the encryption keys from the private data provider.

Example 24

The apparatus of example 23, the experiment description comprising a directed acyclic graph (DAG).

Example 25

The apparatus of example 24, the DAG comprising a plurality of map, reduce, or analytic operations to be performed on private data, the private data corresponding to private data available from the plurality of private data providers in the pool of private data sources.

Example 26

The apparatus of any one of examples 17 to 25, the secure channel interface and the experiment processor to execute in a trusted execution environment.

Example 27

An apparatus, comprising: a trusted execution environment (TEE): a secure channel interface for execution by the TEE, the secure channel interface to establish a secure channel with a private data provider of a plurality of private data providers in a pool of private data sources; and an experiment authenticator for execution by the TEE, the experiment authenticator to: send, via the secure channel, a first information element to the private data provider, the first information element to include an indication of an experiment description that operates on private data available from the private data source; receive, via the secure channel, a second information element from the private data provider, the second information element to include an indication of whether the experiment description is approved.

Example 28

The apparatus of example 27, comprising a computing node authenticator, the computing node authenticator to authenticate a trusted computing node to admit the trusted computing node to a pool of trusted computing nodes.

Example 29

The apparatus of example 28, the computing node authenticator to receive a root of trust from the trusted computing node and to authenticate the trusted computing node based on the root of trust.

Example 30

The apparatus of example 28, the computing node authenticator to: send, via the secure channel, a third information to the private data provider, the third information element to include an indication of the authenticity of the trusted computing node; and receive, via the secure channel, a fourth information element from the private data provider, the fourth information element to include an indication of whether the trusted computing node is authorized to receive the private data.

Example 31

The apparatus of example 27, the experiment authenticator to receive a third information element from an experiment portal, the third information element to include an indication of the experiment description.

Example 32

The apparatus of example 27, the experiment description a directed acyclic graph.

Example 33

At least one machine-readable storage medium comprising instructions that when executed by a trusted execution environment (TEE), cause the TEE to: establish a secure channel with a private data provider of a plurality of private data providers in a pool of private data sources; receive, via the secure channel, encrypted private data from the private data provider; and apply one or more processes to the encrypted private data.

Example 34

The at least one machine-readable storage medium of example 33, comprising instructions that further cause the TEE to receive encryption keys and to decrypt the encrypted private data based on the encryption keys.

Example 35

The at least one machine-readable storage medium of example 34, the secure channel a first secure channel, the medium comprising instructions that further cause the TEE to establish a second secure channel with an experiment orchestrator and to receive the encryption keys from the experiment orchestrator.

Example 36

The at least one machine-readable storage medium of example 33, comprising instructions that further cause the TEE to send an information element to an experiment orchestrator to include an indication of a root of trust of the apparatus.

Example 37

The at least one machine-readable storage medium of example 34, comprising instructions that further cause the TEE to receive an information element from an experiment orchestrator, the information element to include an indication of a portion of an experiment description.

Example 38

The at least one machine-readable storage medium of example 37, comprising instructions that further cause the TEE to receive the encryption keys from the private data provider.

Example 39

The at least one machine-readable storage medium of example 38, the experiment description comprising a directed acyclic graph (DAG).

Example 40

The at least one machine-readable storage medium of example 39, the DAG comprising a plurality of map, reduce, or analytic operations to be performed on private data, the private data corresponding to private data available from the plurality of private data providers in the pool of private data sources.

Example 41

At least one machine-readable storage medium comprising instructions that when executed by a trusted execution environment (TEE), cause the TEE to: establish a secure channel with a private data provider of a plurality of private data providers in a pool of private data sources; send, via the secure channel, a first information element to the private data provider, the first information element to include an indication of an experiment description that operates on private data available from the private data source; and receive, via the secure channel, a second information element from the private data provider, the second information element to include an indication of whether the experiment description is approved.

Example 42

The at least one machine-readable storage medium of example 41, comprising instructions that further cause the TEE to authenticate a trusted computing node to admit the trusted computing node to a pool of trusted computing nodes.

Example 43

The at least one machine-readable storage medium of example 42, comprising instructions that further cause the TEE to receive a root of trust from the trusted computing node and to authenticate the trusted computing node based on the root of trust.

Example 44

The at least one machine-readable storage medium of example 43, comprising instructions that further cause the TEE to: send, via the secure channel, a third information to the private data provider, the third information element to include an indication of the authenticity of the trusted computing node; and receive, via the secure channel, a fourth information element from the private data provider, the fourth information element to include an indication of whether the trusted computing node is authorized to receive the private data.

Example 45

The at least one machine-readable storage medium of example 41, comprising instructions that further cause the TEE to receive a third information element from an experiment portal, the third information element to include an indication of the experiment description.

Example 46

The at least one machine-readable storage medium of example 41, the experiment description a directed acyclic graph.

Example 47

A computer-implemented method comprising: establishing a secure channel with a private data provider of a plurality of private data providers in a pool of private data sources; receiving, via the secure channel, encrypted private data from the private data provider; and applying one or more processes to the encrypted private data.

Example 48

The computer-implemented method of example 47, comprising receiving encryption keys and decrypting the encrypted private data based on the encryption keys.

Example 49

The computer-implemented method of example 48, the secure channel a first secure channel, the method comprising establishing a second secure channel with an experiment orchestrator and receiving the encryption keys from the experiment orchestrator.

Example 50

The computer-implemented method of example 47, comprising sending an information element to an experiment orchestrator to include an indication of a root of trust of the apparatus.

Example 51

The computer-implemented method of example 48, comprising receiving an information element from an experiment orchestrator, the information element to include an indication of a portion of an experiment description.

Example 52

The computer-implemented method of example 51, comprising receiving the encryption keys from the private data provider.

Example 53

The computer-implemented method of example 52, the experiment description comprising a directed acyclic graph (DAG).

Example 54

The computer-implemented method of example 53, the DAG comprising a plurality of map, reduce, or analytic operations to be performed on private data, the private data corresponding to private data available from the plurality of private data providers in the pool of private data sources.

Example 55

A computer-implemented method comprising: establishing a secure channel with a private data provider of a plurality of private data providers in a pool of private data sources; sending, via the secure channel, a first information element to the private data provider, the first information element to include an indication of an experiment description that operates on private data available from the private data source; and receiving, via the secure channel, a second information element from the private data provider, the second information element to include an indication of whether the experiment description is approved.

Example 56

The computer-implemented method of example 55, comprising authenticating a trusted computing node to admit the trusted computing node to a pool of trusted computing nodes.

Example 56

The computer-implemented method of example 56, comprising receiving a root of trust from the trusted computing node and authenticating the trusted computing node based on the root of trust.

Example 58

The computer-implemented method of example 57, comprising: sending, via the secure channel, a third information to the private data provider, the third information element to include an indication of the authenticity of the trusted computing node; and receiving, via the secure channel, a fourth information element from the private data provider, the fourth information element to include an indication of whether the trusted computing node is authorized to receive the private data.

Example 59

The computer-implemented method of example 55, comprising receiving a third information element from an experiment portal, the third information element to include an indication of the experiment description.

Example 60

The computer-implemented method of example 59, the experiment description a directed acyclic graph.

Example 61

An apparatus for a device, the apparatus comprising means for performing the method of any one of examples 47 to 60.

The invention claimed is:

1. An apparatus, comprising:
a network interface;
a processor coupled to the network interface;
memory coupled to the processor, the memory comprising instructions executable by the processor;
a trusted execution environment (TEE) coupled to the processor, the TEE comprising:
a secure co-processor; and
secure memory coupled to the secure co-processor, the secure memory comprising TEE instructions, the TEE instructions executable by the secure co-processor, which when executed by the secure co-processor cause the secure co-processor to:
establish, via the processor and the network interface, a first secure channel with a private data provider of a plurality of private data providers in a pool of private data sources,
receive, via the first secure channel, a first encryption key and encrypted private data from the private data provider,
establish, via the processor and the network interface, a second secure channel with an experiment orchestrator,
receive, via the second secure channel, a second encryption key and a portion of an experiment description, and
apply one or more processes to the encrypted private data based in part on the first encryption key, the second encryption key and the experiment description.

2. The apparatus of claim 1, the TEE instructions, when executed by the secure co-processor cause the secure co-processor to decrypt the encrypted private data based on the encryption keys.

3. The apparatus of claim 1, the TEE instructions, when executed by the secure co-processor cause the secure co-processor to send an information element to the experiment orchestrator to include an indication of a root of trust of the apparatus.

4. The apparatus of claim 1, the apparatus a trusted computing node in a pool of distributed trusted computing nodes.

5. The apparatus of claim 1, the experiment description comprising a directed acyclic graph (DAG).

6. The apparatus of claim 5, the DAG comprising a plurality of map, reduce, or analytic operations to be performed on private data, the private data corresponding to private data available from the plurality of private data providers in the pool of private data sources.

7. An apparatus, comprising:
a network interface; and
a trusted execution environment (TEE) coupled to the network interface, the TEE comprising:
a secure co-processor; and
secure memory coupled to the secure co-processor, the secure memory comprising TEE instructions executable by the secure co-processor, which when executed, cause the secure co-processor to:
establish a secure channel with a private data provider of a plurality of private data providers in a pool of private data sources,
send, via the secure channel, a first information element to the private data provider, the first information element to include an indication of an experiment description that operates on private data available from the plurality of private data providers in the pool of private data sources,
receive, via the secure channel, a second information element from the private data provider, the second information element to include an indication of whether the experiment description is approved, and
authenticate a trusted computing node to admit the trusted computing node to a pool of trusted computing nodes.

8. The apparatus of claim 7, the TEE instructions, when executed by the secure co-processor cause the secure co-processor to:
receive a root of trust from the trusted computing node, and
authenticate the trusted computing node based on the root of trust.

9. The apparatus of claim 7, the TEE instructions, when executed by the secure co-processor cause the secure co-processor to:
send, via the secure channel, a third information element to the private data provider, the third information element to include an indication of the authenticity of the trusted computing node; and
receive, via the secure channel, a fourth information element from the private data provider, the fourth information element to include an indication of whether the trusted computing node is authorized to receive the private data.

10. The apparatus of claim 7, the TEE instructions, when executed by the secure co-processor cause the secure co-processor to receive a third information element from an experiment portal, the third information element to include an indication of the experiment description.

11. The apparatus of claim 7, the experiment description a directed acyclic graph.

12. At least one non-transitory machine-readable storage medium comprising instructions that when executed by a secure co-processor of a trusted execution environment (TEE) of an apparatus comprising a network interface, cause the TEE to:
establish, via the network interface, a first secure channel with a private data provider of a plurality of private data providers in a pool of private data sources;
receive, via the first secure channel, a first encryption key and encrypted private data from the private data provider;
establish, via the network interface, a second secure channel with an experiment orchestrator;
receive, via the second secure channel, a second encryption key and a portion of an experiment description, and
apply one or more processes to the encrypted private data based in part on the first encryption key, the second encryption key and the experiment description.

13. The at least one non-transitory machine-readable storage medium of claim 12, comprising instructions that when executed by the secure co-processor further cause the TEE to decrypt the encrypted private data based on the encryption keys.

14. The at least one non-transitory machine-readable storage medium of claim 13, comprising instructions that when executed by the secure co-processor further cause the TEE to send an information element to the experiment orchestrator to include an indication of a root of trust of the apparatus.

* * * * *